United States Patent [19]

Ito et al.

[11] Patent Number: 5,029,040

[45] Date of Patent: Jul. 2, 1991

[54] OUTPUT CIRCUIT HAVING A FAIL-SAFE FUNCTION

[75] Inventors: Naoyuki Ito; Nobuyasu Suzumura, both of Aichi, Japan

[73] Assignee: Aisin Seiki K.K., Aichi, Japan

[21] Appl. No.: 329,155

[22] Filed: Mar. 27, 1989

[30] Foreign Application Priority Data

Mar. 29, 1988 [JP] Japan .................. 63-75584

[51] Int. Cl.$^5$ .......................... H01H 47/00
[52] U.S. Cl. ..................... 361/187; 318/59; 388/812; 388/820
[58] Field of Search .............. 318/55, 59, 66; 388/804, 805, 811, 812, 813, 814, 815, 819, 820, 823, 824, 831, 832, 911, 915, 920; 361/160, 170, 185, 187, 20 C

[56] References Cited

U.S. PATENT DOCUMENTS

| 4,023,659 | 5/1977 | Arnold | 361/187 |
| 4,214,290 | 7/1980 | Sloan | 361/187 |
| 4,417,187 | 11/1983 | Bateika | 388/820 |
| 4,532,570 | 7/1985 | Thornley et al. | 361/187 |

Primary Examiner—J. R. Scott
Assistant Examiner—J. Gaffin
Attorney, Agent, or Firm—Sughrue, Mion, Zinn Macpeak & Seas

[57] ABSTRACT

An output circuit having a fail-safe function with: a control signal generating circuit which generates a control signal to control the current of a load and includes an operational amplifier which amplifies a difference between a control value and a feedback value to produce the control signal; a drive circuit which drives a load according to the control signal from the operational amplifier; an output current detecting circuit for detecting a current in a load solenoid and adding an offset current to the detected current, with the output of the output current detecting circuit being fed back to the control voltage generating circuit as the feedback value.

5 Claims, 3 Drawing Sheets

OUTPUT CIRCUIT HAVING A FAIL-SAFE FUNCTION

BACKGROUND OF THE INVENTION

1. Field of the Invention

This invention relates to an output circuit having a fail-safe function, and more particularly to an output circuit having an output current detecting circuit for detecting a current through a load for a feedback control and a fail-safe function which operates for safety upon occurrence of an electrical short-circuit between the load and the output current detecting circuit.

2. Description of the Prior Art

A conventional fan motor control device having an output current detecting circuit is shown in FIG. 3. An air conditioner switch signal and a water temperature sensor signal are input to the fan motor control unit. A linear solenoid driving signal is output from the fan motor control unit to a solenoid L. A relationship between the water temperature and the solenoid current or fan revolutions per minute is shown in FIG. 4. In this device, a solenoid current is detected by a resistor R. One end of the resistor R is connected to the solenoid L. The other end of the resistor R is connected to ground in the fan motor control unit. The solenoid current is equal to the current through the resistor R. Therefore, it is possible to determine the solenoid current from the voltage across the resistor R.

The solenoid L is controlled by a feedback of the voltage to obtain a constant revolution of the fan. The resistor R is one part of an output current detecting circuit.

If the line between the solenoid L and the resistor R is short circuited to ground, the voltage across the resistor R becomes zero. Accordingly, the fan motor control unit regards the solenoid current as being zero so that the fan motor unit raises the solenoid current up to the maximum value. In this case, the number of fan revolutions will be low so the motor vehicle engine will be overheated.

SUMMARY OF THE INVENTION

An object of the invention is to provide an output circuit having a fail-safe function wherein an output current detecting circuit has an arrangement for providing suitable operation even during times when an electrical short-circuit exists between ground and the a current detecting element.

Other and further objects of this invention will become obvious upon an understanding of the illustrative embodiment about to be described or will be indicated in the appended claims, and various advantages not referred to herein will occur to one skilled in the art upon employment of the invention in practice.

DETAILED DESCRIPTION OF THE INVENTION

Figure 1:
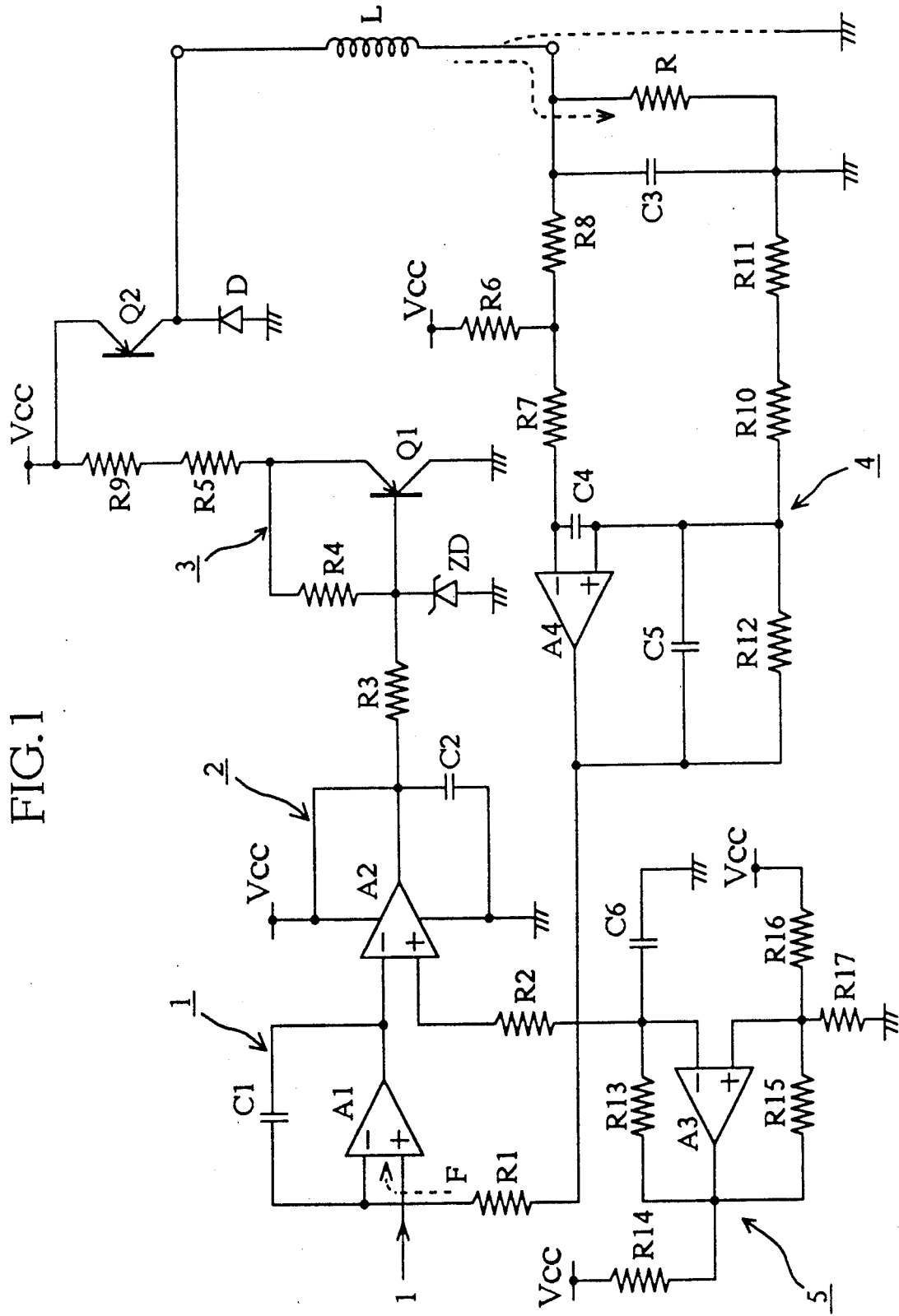
FIG. 1 shows a circuit diagram of an output circuit of the fan motor driving system of this invention.

In the exemplary embodiment of the invention as disclosed in the drawings, FIG. 1 illustrates a circuit diagram of an output circuit with a solenoid L as a load. The solenoid L is used for driving a fan motor. The solenoid L is controlled by a duty ratio control of the output circuit. When the duty ratio is large, a revolution of the fan is slow. When the duty ratio is small, the revolution is fast. A control voltage generating circuit 1 is comprised of an operational amplifier A1. The operational amplifier A1 amplifies a difference between a control value I and a feedback value F. A modulation circuit 2 is comprised of a comparator A2. The comparator A2 compares the output of the operational amplifier A1 of the control voltage generating circuit 1 and an output of a chopping wave generating circuit 5. The chopping wave generating circuit 5 is comprised of a comparator A3, resistors R13, R14, R15, R16 and R17 and a condenser C6. The chopping wave generating circuit 5 generates chopping waves and outputs the waves to a non-inverted input terminal of the comparator A2. The comparator A2 outputs a drive signal whose pulse width corresponds to the voltage value of the output of the operational amplifier A1. A drive circuit is comprised of transistors Q1 and Q2, resistors R3, R4, R5 and R9, a diode D and a zener diode ZD. The output of the comparator A2 of the modulation circuit 2 is applied as an input to the base of the transistor Q1 via a resistor R3. An emitter of the transistor Q1 is connected to the base of the transistor Q2 via a resistor R5. When the output level of the comparator A2 is at a high level, the transistor Q1 is turned off and the transistor Q2 is turned off. When the output level of the comparator A2 is at a low level, the transistor Q1 is turned on and the transistor Q2 is turned on. The zener diode ZD prevents an abnormal rise of the base voltage of the transistor Q1. The diode D is used for flywheeling of the solenoid L. The solenoid L and a current detecting resistor R are connected in series between the collector of the transistor Q2 of the drive circuit 3 and the ground. When the transistor Q2 is in the on-condition, the solenoid L is energized. Most of the current of the solenoid L flows to the resistor R. The voltage measured across the resistor R corresponds to the current of the solenoid L. A line between the solenoid L and the resistor R is connected to operational amplifier A4 via resistors R8 and R7. A line between the resistors R7 and R8 is biased with a constant voltage Vcc via resistor R6. A sum of an offset voltage comprises of voltages associated with the resistors R6 and R8 and the voltage of resistor R is input to the operational amplifier A4 via the resistor R7. The gain of the operational amplifier A4 depends on resistors R10, R11 and R12. An output of the operational amplifier A4 is connected to the inverted input terminal of the operational amplifier A1 of the control voltage generating circuit 1 via a resistor R1 as the feedback value F. The operational amplifier A4, resistors R, R1, R6, R7, R8, R10, R11 and R12 constitute an output detecting circuit 4. In this embodiment, the offset voltage input to the operational amplifier A4 is chosen by the resistor R6 to be equal to a control value input to the operational amplifier A1 which cuts off the solenoid L.

The operation of the output circuit of the solenoid L will now be explained.

When the control value I is larger than the feedback value F input to the operational amplifier A4, the difference between the control value I and the feedback value F is amplified. The amplified value is modulated to a pulse width by the modulation circuit 2. The chopping wave signal generating circuit 5 generates chopping waves in a constant cycle. First, the voltage of the non-reversed input terminal of the comparator A2 is raised slowly. When the voltage is larger than the amplified value, the output of the comparator A2 is turned on. Second, the voltage of the non-reversed input terminal goes down slowly. When the voltage is smaller than the amplified value, the output of the comparator A2 is turned off. The amplified value is changed as a duty ratio by the modulation circuit 12. The solenoid L is energized by the duty ratio control according to the pulse width. When the solenoid L is changed to the voltage value by the current detecting resistor R, the voltage value is added to the offset voltage by the resistor R6 and R8. The added voltage value is amplified by the operational amplifier A4 so as to be the feedback value F. If the feedback value F is larger than the control value I, the output voltage of the operational amplifier A1 becomes zero level. Thus, the output of the comparator A2 is raised up to a high level and the solenoid L is not energized. Accordingly, the feedback value becomes lower. If the feedback value is smaller than the control value, the solenoid L is energized according to the difference between the control value I and feedback value F. Accordingly, the feedback value becomes higher. In this way, the solenoid L is driven so that the current in the solenoid L may be equal to the value established by the control value indirectly. When the control value is large, the duty ratio is small and the solenoid current is small, so that the fan motor revolves fast. When the control value is small, the duty ratio is large and the solenoid current is large, so that the fan motor revolves slow.

Figure 2:
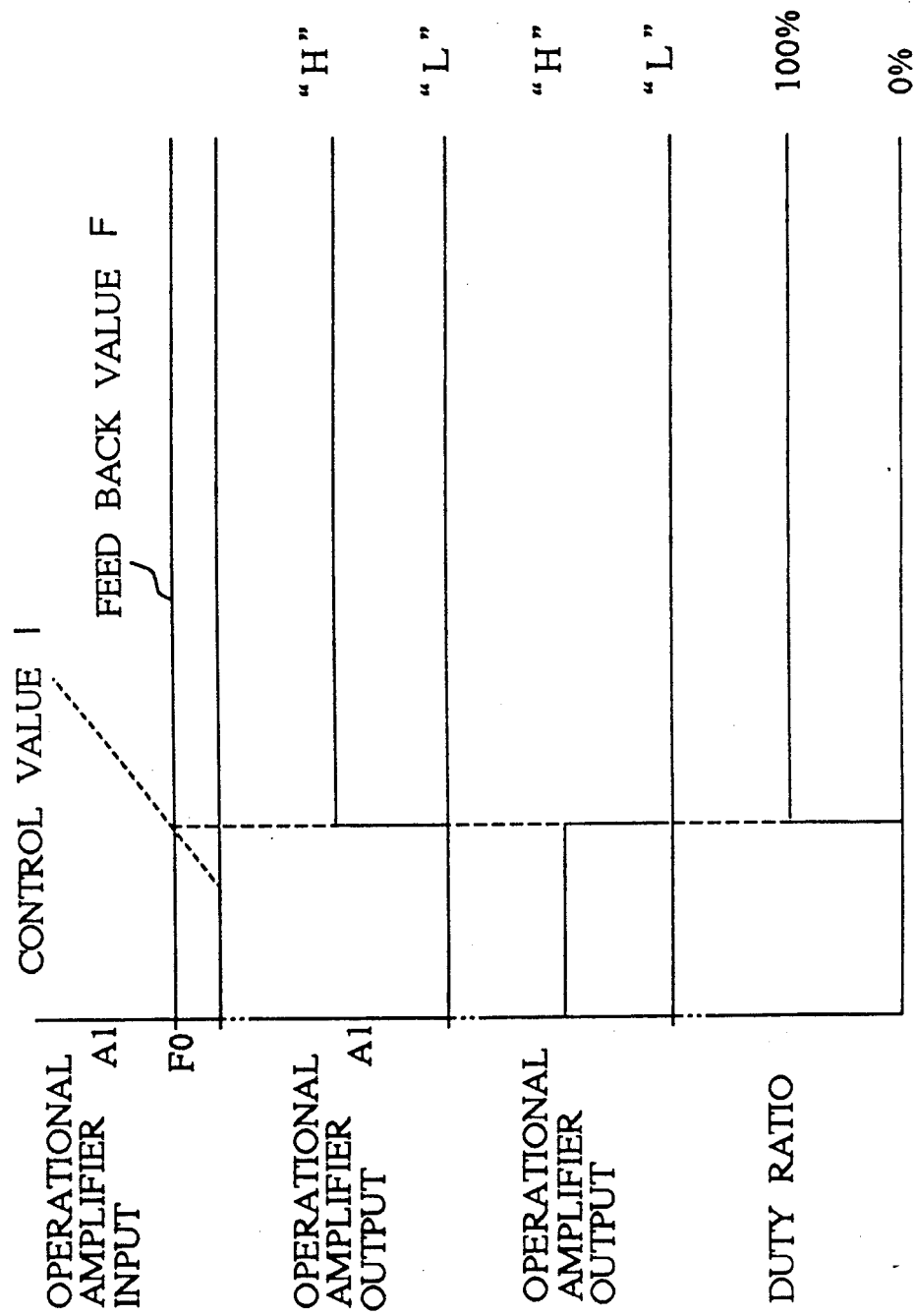
FIG. 2 shows a time chart in the case where the ground side line of the solenoid is short-circuited to the ground in the circuit of FIG. 2.
Figure 3:
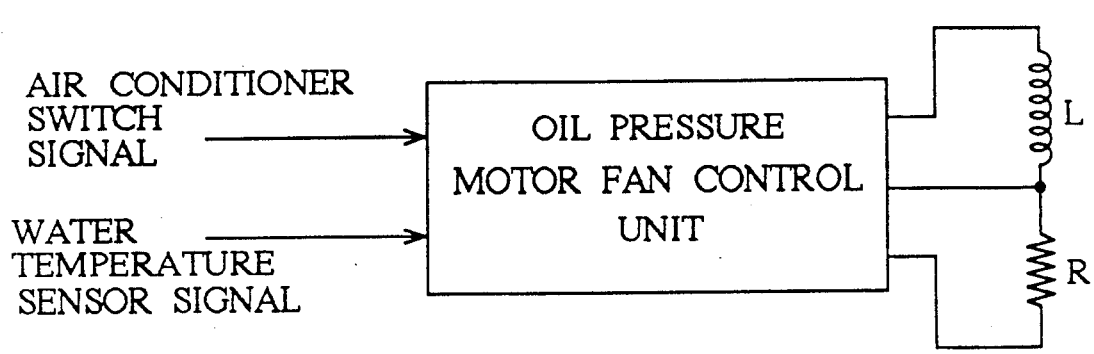
FIG. 3 shows a block diagram of a conventional fan motor driving system.
Figure 4:
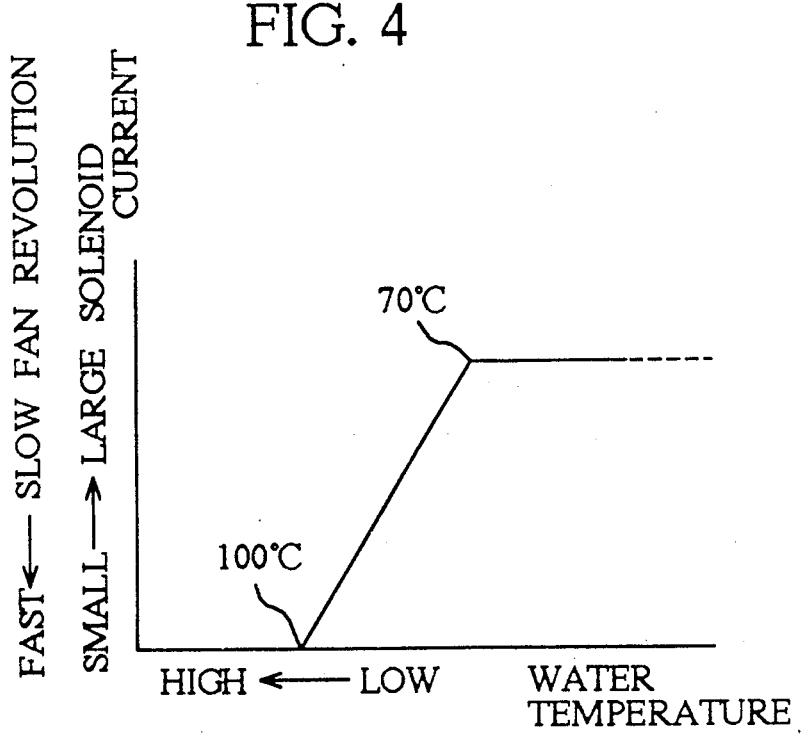
FIG. 4 is a graph showing the relationship between the water temperature and solenoid current or fan revolutions of the system of FIG. 3.

Usually, the current of the solenoid L is not zero when the solenoid L is energized, so the voltage between each side of the resistor R is not zero. When the line between the solenoid L and the resistor R short-circuits to ground, the voltage across the resistor R becomes zero. In this state, the operational amplifier amplifies only the offset voltage by the resistors R6 and R8. The amplified voltage is a feedback value FO corresponding to the offset voltage as shown in FIG. 2. The feedback value FO corresponds to a control value which cuts off the solenoid L. Usually, when the solenoid L is driven normally, the control value is larger than a control value which cuts off the solenoid L. Thus, the output of the operational amplifier A1 in the abnormal case is larger than the output in the normal case. Accordingly the duty ratio of the solenoid is smaller and the solenoid current is smaller so that the fan motor revolves faster. When the solenoid L is not driven normally, the control value is smaller than a control value which cuts off the solenoid L. Thus, the output of the operational amplifier A1 is zero and the output of the comparator A2 is at a high level. Accordingly, the solenoid is not energized and the fan motor revolves faster.

Thus, whenever the line between the solenoid L and the output current detecting resistor R is short-circuited to ground, the revolution of the fan motor is fast in the low control value and is slow in the high control value, without exact control of the fan revolution. Accordingly, if the line between the solenoid and the output current detecting resistor is short-circuited to the earth, the fan will be able to revolve faster so that overheating will not happen.

In this embodiment, although a chopped wave generating circuit is used, it is possible to use a saw tooth wave generating circuit.

The output circuit with the fail-safe function is able to use another load such as a solenoid or an actuator in addition to the fan motor.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What is claimed is:

1. An output circuit having a fail-safe function comprising:
   a control signal generating circuit which generates a control signal to control a current of a load and comprising an operational amplifier, the operational amplifier amplifying a difference between a control value and a feedback value and generating the control signal;
   a drive circuit which drives the load according to the output of the operational amplifier; and
   an output current detecting circuit for detecting a current in said load and adding an offset to the current thereby to produce an output current, wherein the output current of the output current detecting circuit is fed back to the control voltage generating circuit as a feedback value.

2. An output circuit according to claim 1, wherein the drive circuit generates a drive signal with a duty ratio according to the control signal and drives the load by the duty ratio.

3. An output circuit according to claim 1, wherein the operational amplifier amplifies a control voltage as the control signal, and the drive circuit comprises a chopped wave generating circuit which generates chopped waves and a comparator which compares the control voltage and the chopped wave.

4. An output circuit according to claim 1, wherein the operational amplifies amplifying a control voltage as a control signal, and the drive circuit comprises a saw tooth wave generating circuit which generates saw tooth waves and a comparator which compares the control voltage and the saw tooth wave.

5. An output circuit according to claim 1 wherein the output current detecting circuit has a resistor which is connected to the load in series, a second operational amplifier which outputs the feedback value, a second resistor whose one end is connected to a constant voltage and whose other end is connected to the input of the second operational amplifier, and a third resister whose one end is connected to a line between the load and the resister which connects the load in series and whose other end is connected to the input of the operational amplifier.

* * * * *